United States Patent
Hoagland et al.

(10) Patent No.: US 6,731,947 B2
(45) Date of Patent: May 4, 2004

(54) METHOD AND APPARATUS FOR CONTROLLING DATA RATE ON A FORWARD CHANNEL IN A WIRELESS COMMUNICATION SYSTEM

(75) Inventors: Greg M. Hoagland, San Diego, CA (US); Robert H. Kimball, San Diego, CA (US); Michael-David Nakayoshi Canoy, San Diego, CA (US); Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 281 days.

(21) Appl. No.: 10/000,601

(22) Filed: Oct. 23, 2001

(65) Prior Publication Data

US 2003/0078065 A1 Apr. 24, 2003

(51) Int. Cl.⁷ .................................................. H04B 7/00
(52) U.S. Cl. ...................... 455/517; 455/509; 370/342; 370/510
(58) Field of Search ............................... 455/500, 509, 455/517, 507, 445, 450, 452.1, 452.2, 453; 370/320, 335, 342, 510

(56) References Cited

U.S. PATENT DOCUMENTS

| | | |
|---|---|---|
| 4,901,307 A | 2/1990 | Gilhousen et al. |
| 5,103,459 A | 4/1992 | Gilhousen et al. |
| 2002/0105974 A1 * | 8/2002 | Cheng et al. .............. 370/510 |
| 2002/0114287 A1 * | 8/2002 | Gupta et al. .............. 370/252 |

FOREIGN PATENT DOCUMENTS

| | | |
|---|---|---|
| EP | B3 1213869 | 6/2002 |
| WO | B1 9824199 | 6/1998 |
| WO | B2 0171926 | 9/2001 |

OTHER PUBLICATIONS

Ting et al. "Dynamic Multithreshold Rate Control Mechanisms for Supporting ABR Traffic in ATM Networks", IEEE Transactions on Industrial Electronics, New York, vol. 45 No. 1, Feb. 1998, pp. 60–68.

* cited by examiner

Primary Examiner—Nay Maung
Assistant Examiner—Edan Orgad
(74) Attorney, Agent, or Firm—Philip Wadsworth; Kent Baker

(57) ABSTRACT

In one disclosed embodiment, communication between a mobile unit and a base station is performed at a data transfer rate selected from, for example, a finite set of HDR data transfer rates. Meanwhile, the mobile unit continually computes a moving average of the data transfer rates. The mobile unit also ascertains a supportable data rate for receiving data. The supportable data rate can be selected from a finite set of HDR data transfer rates. In order to maintain the moving average of the data transfer rate within a specified range, the mobile unit transmits maximum data rate requests or null data requests to the base station. The maximum data rates requested by the mobile unit are equal to or lower than the supportable data rate.

30 Claims, 5 Drawing Sheets

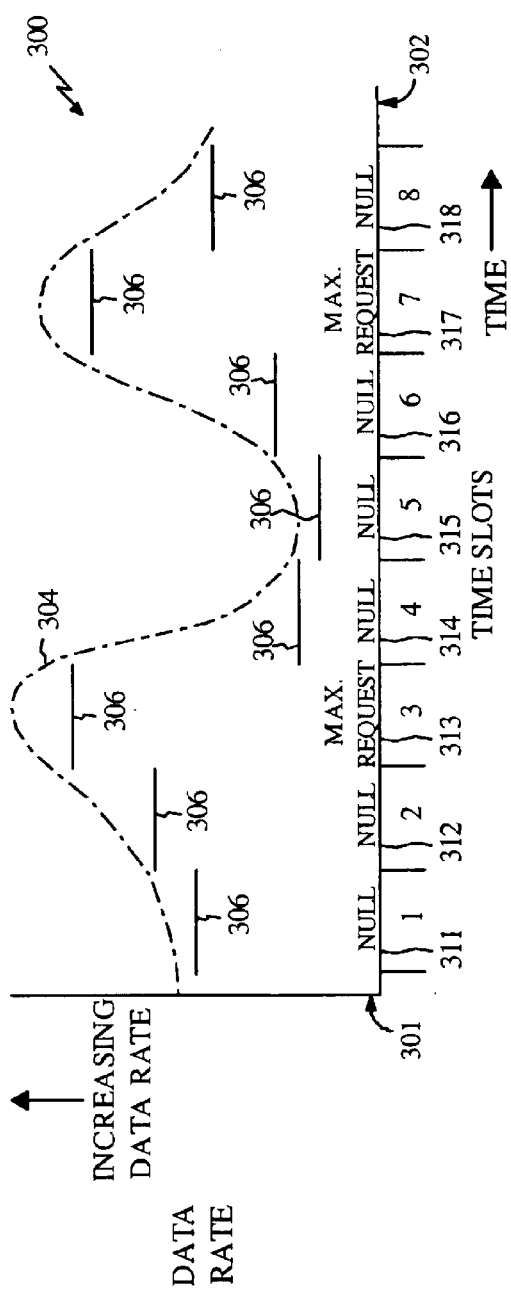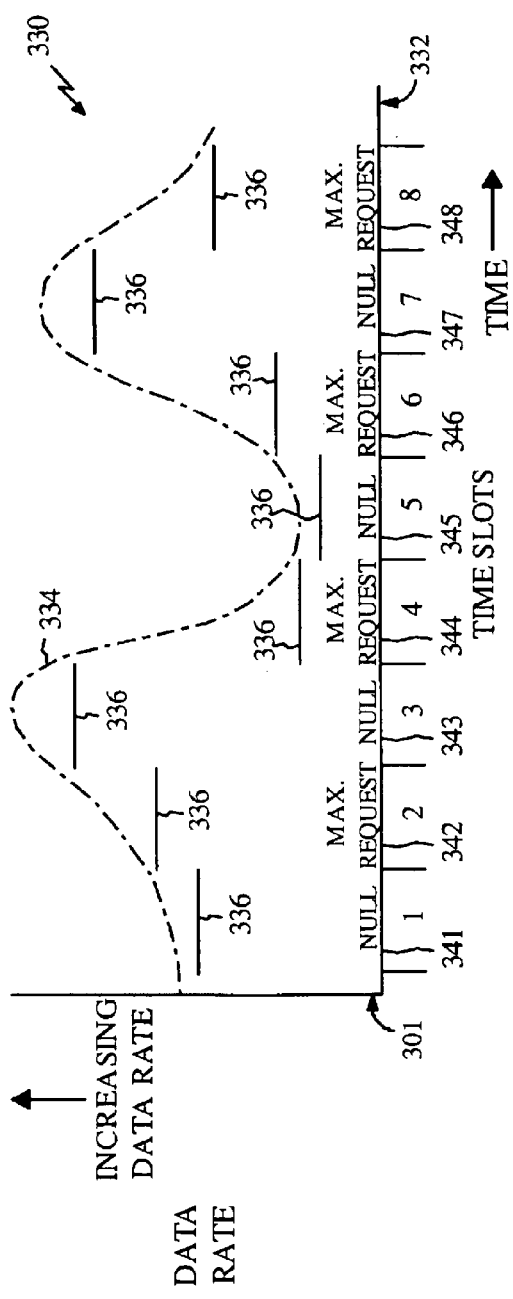

METHOD AND APPARATUS FOR CONTROLLING DATA RATE ON A FORWARD CHANNEL IN A WIRELESS COMMUNICATION SYSTEM

BACKGROUND OF THE INVENTION

1. Field

The present invention relates generally to the field of wireless communication systems, and more specifically to high data rate ("HDR") data transmission in wireless communication systems.

2. Background

In wireless communication systems several users may share a common communication channel. To avoid conflicts arising from several users transmitting information over the communication channel at the same time, some allocation of the available channel capacity to the users is required. Allocation of user access to the communication channel is achieved by various forms of multiple access protocols. One form of protocol is code division multiple access ("CDMA") and another form of protocol is time division multiple access ("TDMA").

In CDMA systems each user uniquely encodes its communication signal into a transmission signal in order to separate its signal from those of other users. The encoding of the message signal spreads its spectrum so that the bandwidth of the encoded transmission signal is much greater than the original bandwidth of the message signal. For this reason CDMA systems are also referred to as "spread spectrum" systems. In TDMA systems each user transmits its communication signal in a uniquely assigned time slot. The time slots do not overlap so that each user's signal is separated from those of other users.

HDR data transmission is a technology that can provide data transmission in a standard CDMA voice communication channel. HDR can be used to enhance data capabilities in existing CDMA networks or in stand-alone data networks. For example, HDR can provide data transmission rates of approximately 2.4 million bits per second ("Mbps"). With existing CDMA networks, some number of channels are changed from voice to data. HDR uses a combination of CDMA and TDMA to share each communication channel among several users. However, HDR assigns time slots on an as-needed basis rather than on a fixed basis as with TDMA.

FIG. 1 illustrates an example of communication channels used for transmitting data using HDR in a CDMA wireless communication system. Communication system 100 shown in FIG. 1 might be, for example, part of a cdma2000 spread spectrum communication system. As shown in FIG. 1, mobile unit 102, which can be an HDR modem, communicates with base station 112 over a communication channel provided by radio frequency signal propagation between mobile unit antenna 110 connected to mobile unit 102 and base station antenna 114 connected to base station 112. Mobile unit 102 may optionally be connected to a computer, such as a personal computer ("PC"), for example, PC 104. PC 104 can be connected to mobile unit 102 by data link 106, which can be a serial cable connected to an RS-232 port, for example. (RS-232 refers to Recommended Standard-232, a standard for serial transmission between computers and peripheral devices, now officially referred to as TIA/EIA-232-E.)

The communication channel includes forward data channel 116, which can be used for carrying user data, indicated in FIG. 1 by an arrow which points in the forward direction from base station 112 to mobile unit 102. The communication channel also includes forward control channel 118, which can be used for carrying signaling information and power control information, indicated in FIG. 1 by an arrow which also points in the forward direction. The communication channel further includes reverse data channel 120, which can be used for carrying user data, indicated in FIG. 1 by an arrow which points in the reverse direction from mobile unit 102 to base station 112. The communication channel also includes reverse control channel 122, which can be used for carrying signaling information and power control information, indicated in FIG. 1 by an arrow which also points in the reverse direction.

HDR data rates can vary depending on certain factors. For example, HDR data rates can vary depending on the distance from the mobile unit, i.e. the HDR modem, to the base station. HDR data rates can also vary from time slot to time slot, for example, depending on the instantaneous signal quality, generally measured as signal to noise ratio, of the communication channel. As seen in FIG. 1, the communication channel also includes data request channel ("DRC") 124. DRC 124 is used to specify either the maximum data rate that the instantaneous signal quality of the communication channel can support or the null data rate as specified by Interim Standard 856 ("IS-856"), the technical specifications for the HDR air interface.

When a high data rate modem such as HDR modem 102 is coupled to PC 104 through data link 106, for example, an RS-232 port, which has a lower data rate, a "bottleneck" problem arises. In the HDR modem, with data coming into the data buffer at the HDR data rate of approximately 2.4 Mbps and leaving the data buffer at the RS-232 data rate of approximately 115 thousand bits per second ("Kbps"), it is possible for data to "overflow" the buffer, i.e. data is lost. The bottleneck problem can be partially solved by providing a larger data buffer, but at differing data rates it is possible for data to overflow the buffer and be lost regardless of the data buffer size. Another problem which arises is that occasionally in wireless systems, data needs to be retransmitted, due, for example, to the varying signal quality of the communication channel which can be caused by noise or interference. In general, the retransmit data is given a higher priority for transmission than other data, for example, in order to maintain orderly filling and emptying of data buffers.

Various protocols exist for controlling the data rate on a data link, also referred to as "flow control." As an illustration, flow control can be provided between a modem and a PC in hardware, for example, an RS-232 data link, by providing a separate control link, one for the modem and one for the PC, so that each can start and stop data flow from the other. Thus, if the data buffer in the modem starts to fill up, the modem can stop data flow from the PC until the modem can "catch up" by processing data out of its buffer. Flow control can also be provided between a modem and a PC in software, such as an Xon/Xoff protocol, by including special control characters, i.e. characters which cannot be interpreted as data, in the data stream. The special control characters can be used by the modem and the PC so that each can start and stop data flow from the other. Thus, if the data buffer in the modem starts to fill up, the modem can stop data flow from the PC by sending a special character to stop data flow, until the modem can "catch up" by processing data out of its buffer, and then sending another special character to restart data flow.

Neither the hardware flow control nor the software flow control protocols are sensitive to the requirements for re-transmitting data in wireless systems, in general, or the requirements for transmission of retransmit and other priority data in HDR technology, in particular. Thus, even though HDR technology provides separate data and control channels and a separate data request channel ("DRC"), application of existing flow control protocols in HDR typically creates problems with transmission of retransmit and other priority data. For example, existing flow control protocols can stop data transmission for too long so that retransmit or priority data is either lost or needs to be retransmitted unnecessarily. According to the IS-856 technical standard for HDR modems, the DRC channel is used to specify only the null data rate or the maximum data rate that the instantaneous signal quality of the communication channel can support. The DRC channel, thus, cannot be used to specify any optional data rates, such as a data rate compatible with a particular modem buffer and modem processing speed.

Thus, there is a need in the art for flow control in HDR data transmission in wireless communication systems. Moreover, there is a need in the art for adjusting the data rate of HDR data links in wireless communication systems without interfering with transmission of retransmit and other priority data.

SUMMARY

Embodiments disclosed herein address the above stated needs by providing flow control in HDR data transmission in wireless communication systems. Moreover, an embodiment adjusts the data rate of HDR data links in wireless communication systems without interfering with transmission of retransmit and other priority data.

In one aspect of the invention, communication between a mobile unit and a base station is performed at a data transfer rate selected from a finite set of HDR data transfer rates. Meanwhile, the mobile unit continually computes a moving average of the data transfer rates. For example, the mobile unit computes the moving average of the data transfer rates over a pre-determined number of HDR time slots. The mobile unit also ascertains a supportable data rate for receiving data. For example, the supportable data rate is ascertained by measuring the signal quality of the communications channel being received from the base station. The supportable data rate can be selected from a finite set of HDR data transfer rates.

In order to maintain the moving average of the data transfer rate within a specified range, the mobile unit transmits maximum data rate requests or null data requests to the base station. The maximum data rates requested by the mobile unit are equal to or lower than the supportable data rate.

BRIEF DESCRIPTION OF THE DRAWINGS

FIGS. 3A, 3B, and 3C are graphs of data rate plotted against time illustrating three distinct examples of controlling data rate using an HDR modem in an exemplary wireless communication system in accordance with different embodiments of the present invention.

DETAILED DESCRIPTION

The presently disclosed embodiments are directed to method and apparatus for controlling data rate on a forward channel in a wireless communication system. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to mere example embodiments of the invention. To maintain brevity, other embodiments of the invention which use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Figure 2:
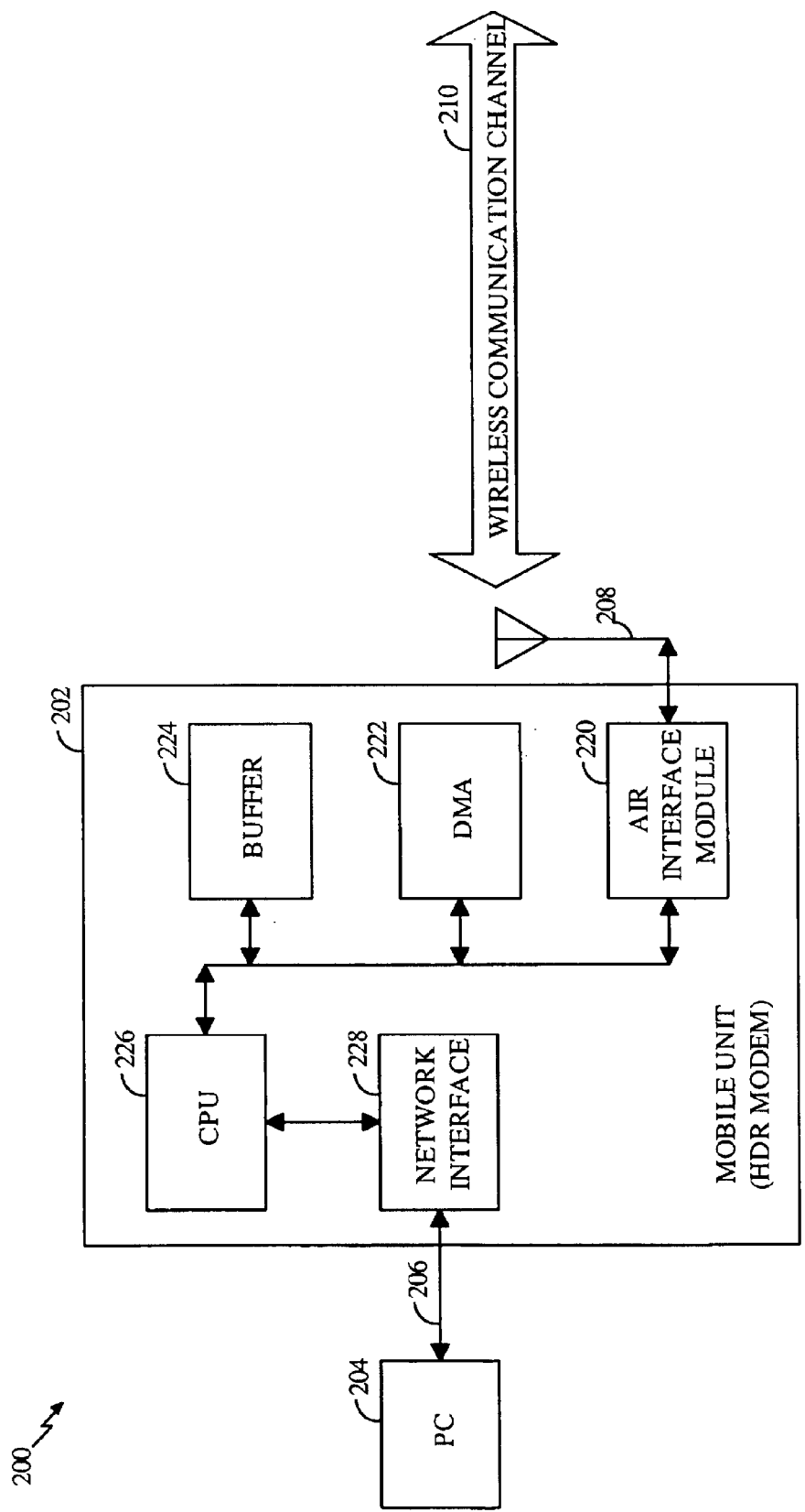
FIG. 2 is a block diagram illustrating an exemplary HDR modem used for controlling data rate in an exemplary wireless communication system in accordance with one embodiment of the present invention.

Referring now to FIG. 2, some of the features and components of an exemplary HDR modem used for controlling data rate in an exemplary CDMA wireless communication system in accordance with one embodiment are illustrated. FIG. 2 shows an exemplary system 200 including a mobile unit such as HDR modem 202, connected to personal computer ("PC") 204 via connection 206 which may include, for example, an ethernet interface to a local area network ("LAN") connected to HDR modem 202, a universal serial bus ("USB") interface connection to HDR modem 202, a personal computer memory card international association ("PCMCIA") interface to HDR modem 202, or a serial cable connected to an RS-232 port. HDR modem 202 communicates with a base station (not shown in FIG. 2) over wireless communication channel 210 through antenna 208. Communication channel 210 can be, for example, radio frequency transmission between transmit and receive antennas in a CDMA wireless communication system. Thus, HDR modem 202 is included in a CDMA communication system.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. The disclosure in U.S. Pat. No. 4,901,307, is hereby fully incorporated by reference into the present application. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. The disclosure in U.S. Pat. No. 5,103,459, is also hereby fully incorporated by reference into the present application. Further, the present invention utilizes time multiplexing of data and various principles related to "high data rate" communication systems, and the present invention can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention. The disclosure in that patent application is also hereby fully incorporated by reference into the present application.

Continuing with FIG. 2, HDR modem 202 comprises several modules including air interface module 220, direct memory access ("DMA") module 222, buffer 224, a central processing unit—CPU 226, and network interface 228. The flow of information between modules is indicated in the block diagram of FIG. 2 by the arrows between modules which also indicate the direction of information flow.

Air interface module 220 is configured to communicate with a base station over wireless communication channel 210. For example, air interface module 220 can be an HDR CDMA modem which communicates with a base station (not shown in FIG. 2) of the CDMA wireless communication system. For example, air interface module 220 can communicate with a base station for purposes of downloading data from the Internet to be fed to PC 204 for use by a computer user.

DMA module 222 is configured to transfer data from air interface module 220 to buffer 224. For example, DMA module 222 can include specialized circuitry or a dedicated microprocessor that transfers data directly from air interface module 220 to buffer 224 with minimal interaction required of CPU 226, in order to transfer data more quickly than using CPU 226 for each byte of data transfer. Buffer 224 is configured to receive data from DMA module 222 and store it for further processing by CPU 226. For example, buffer 224 can be a random access memory ("RAM").

CPU 226 is configured to receive data from buffer 224 and to provide the data to network interface 228. In addition, CPU 226 mediates orderly communication among all the modules of HDR modem 202 shown in FIG. 2. Typically, CPU 226 processes the data in buffer 224 in complete blocks of data. Thus, if there is a problem in the transmission of data, which can be detected, for example, using error correction codes such as cyclic redundancy checking ("CRC"), which leaves a block of data in the buffer incomplete, the incorrect data will be corrected in order to complete the block of data before the entire block of data is removed from the buffer for processing. The incorrect data is corrected by requesting re-transmission of the incorrect data. The re-transmission of the incorrect data, referred to as "retransmit" data, is given a higher priority than other data in order to facilitate completing the entire block of data before processing so that data transfer occurs in an orderly manner.

Orderly data transfer requires that buffer 224 not overflow. This requires that over an extended period of time buffer 224 be filled no faster than it is emptied. The rate at which buffer 224 can be emptied depends on several factors, for example, the processing speed of CPU 226; the amount of data errors requiring re-transmission of data as described above, which is dependent on varying signal quality of the communication channel; and the speed of network interface 228. The intractability of these factors necessitates controlling the data transfer rate of air interface module 220 when data is being received.

According to the IS-856 technical standard for the HDR modem air interface, air interface module 220 can send a data rate request in each time slot for either the null data rate, i.e. no data will be transmitted, or the maximum data rate that the instantaneous signal quality of the communication channel can support, also referred to as "supportable data rate." According to one embodiment, CPU 226 and air interface module 220 are configured to intersperse null data requests, i.e. a data rate request for a null data rate, with maximum data requests, i.e. a data rate request for the maximum data rate that the instantaneous signal quality of the communication channel can support. By interspersing null data requests with maximum data requests the average data rate over several time slots of the data transfer rates for each of the time slots can be controlled to conform to the rate at which buffer 224 can be emptied. In addition, interspersing null data requests with maximum data requests avoids interfering with retransmit data and other priority data because enough maximum data rates can be requested in time to receive priority data. Several techniques for interspersing are feasible, as further described below.

Network interface 228 is configured to communicate with CPU 226 and to communicate with PC 204 so that orderly communication is provided between CPU 226 and PC 204. For example, network interface 228 can be a serial interface such as an RS-232 port, an ethernet interface, a standard USB or PCMCIA interface, or any other suitable interface for enabling communication between HDR modem 202 and PC 204. Thus, FIG. 2 illustrates some of the features and components of an exemplary HDR modem used for controlling data rate in an exemplary CDMA wireless communication system in accordance with one embodiment.

Figure 1:
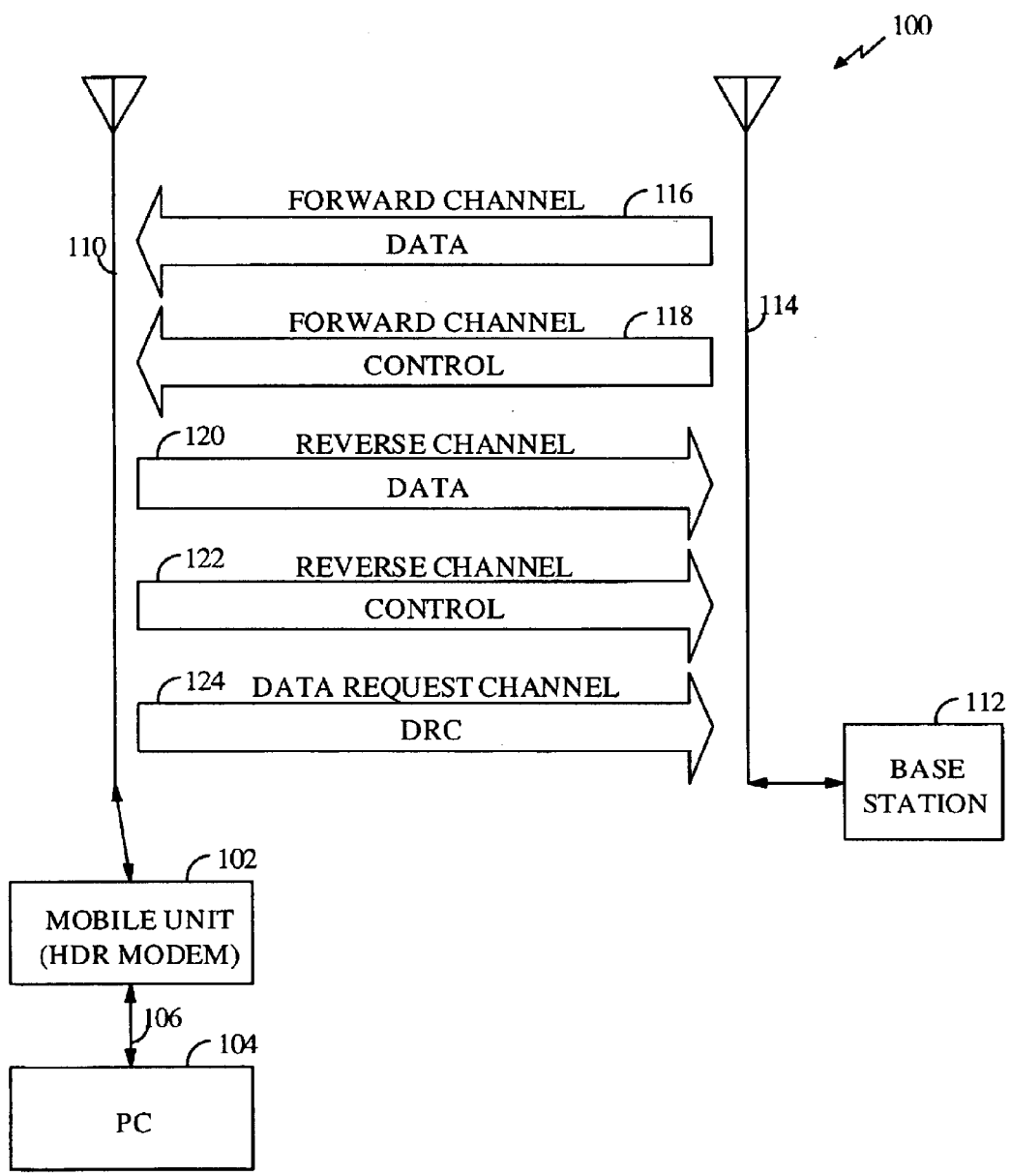
FIG. 1 is a block diagram illustrating an example of communication channels used for transmitting data using HDR in a CDMA wireless communication system.
Figure 3C:
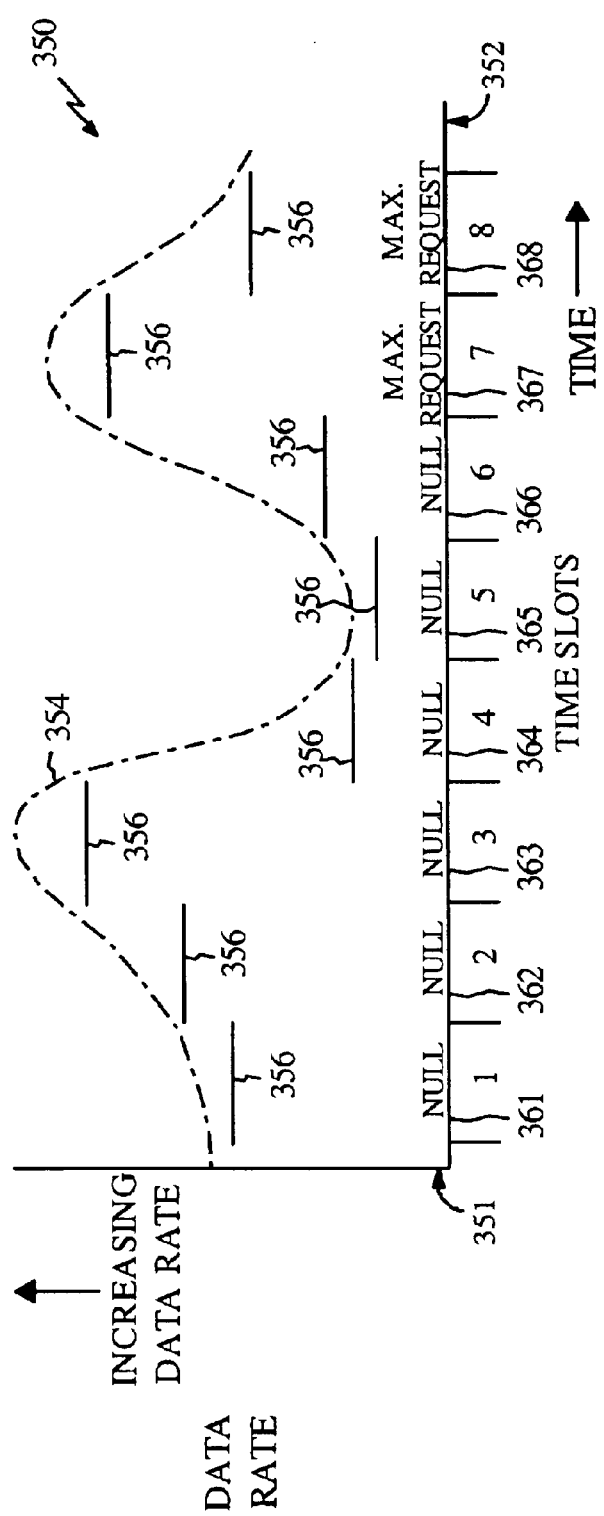

FIGS. 3A, 3B, and 3C illustrate three distinct examples of controlling data rate using an HDR modem in an exemplary wireless communication system in accordance with different embodiments. Referring now to FIG. 3A, an example is illustrated of controlling data rates using an HDR modem in an exemplary CDMA wireless communication system in accordance with one embodiment. FIG. 3A shows graph 300 having data rate axis 301. Graph 300 shows data rate axis 301 plotted against time axis 302. Graph 300 shows an illustrative example of the instantaneous maximum data rate of a communication channel, such as forward data channel 116 shown in FIG. 1, which varies with time according to instantaneous maximum data rate curve 304. The instantaneous maximum data rate of a communication channel is directly proportional to the instantaneous signal quality of the communication channel. For example, signal quality can be measured as the signal to noise ratio of the communication channel which can be expressed in decibels. The higher the instantaneous signal quality, the higher the maximum data rate that the instantaneous signal quality of the communication channel can support.

In the illustrative example shown in graph 300, time axis 302 is divided into 8 time slots, time slot 311 through time slot 318, numbered consecutively 1 through 8 in FIG. 3A. The standard HDR time slot, for example, is approximately 1.6 milliseconds (abbreviated "msec") in duration. The maximum data rate for each time slot that the instantaneous signal quality of the communication channel can support, i.e. supportable data rate 306, is shown in FIG. 3A as horizontal steps corresponding to the data rate scale of data rate axis 301. Supportable data rate 306 is chosen from a finite set of available data rates according to the HDR technical specifications. For example, the data rates range in value from the maximum HOR data rate of approximately 2.4 Mbps to the minimum HDR data rate of approximately 38 Kbps. As seen in FIG. 3A, supportable data rate 306 must be less than the instantaneous maximum data rate curve 304. In other words, supportable data rate 306 must be below the instantaneous maximum data rate curve 304 because supportable data rate 306 cannot exceed the capacity of the communication channel. Thus, supportable data rate 306 in graph 300 varies from time slot to time slot as shown in FIG. 3A.

According to the IS-856 technical standard for the HDR modem air interface, the HDR modem can send a data rate request over the data request channel in each time slot for either the null data rate, i.e. no data will be transmitted, or the maximum data rate that the instantaneous signal quality of the communication channel can support, i.e. the supportable data rate. In normal or conventional operation of the HDR modem the HDR modem would send requests for the supportable data rate, i.e. maximum data rate requests. Thus, the data rate requested would be the maximum data rate that the communication channel can support, so that if there are any problems with the HDR modem processor, DMA, or buffer, data could potentially be lost.

FIG. 3A shows one example of interspersing null data requests with maximum data requests to control the average data transfer rate in order to accommodate the processor, DMA, or buffer. In the example of FIG. 3A, maximum data requests are sent on time slots 313 and 317, as indicated by the notation "Max. Request" above time slots 313 and 317, and null data requests are sent on time slots 311, 312, 314, 315, 316, and 318, as indicated by the notation "Null" above time slots 311, 312, 314, 315, 316, and 318. By not receiving data in time slots 311, 312, 314, 315, 316, and 318, and only receiving data in time slots 313 and 317, the average data rate is controlled.

For example, the average data rate can be controlled by computing the average data rate over a number of time slots as time goes on, i.e. computing a moving average data rate, and sending maximum data requests on time slots for which supportable data rate 306 is above some specific value required to maintain the moving average data rate within a specified range and sending null data requests otherwise. Thus, in the example shown in FIG. 3A, supportable data rate 306 is above the specific value required to maintain the moving average data rate within the example's specified range in time slots 313 and 317.

The technique illustrated in FIG. 3A is very efficient in that data is transmitted in the best time slots for each particular user, so that even though the HDR modem maintains its own data rate below that which it can accommodate, the fewest number of time slots, which are a shared system resource, is used to do so. In other words, the technique shown in FIG. 3A allows other users in the same system to use more of the remaining time slots, such as time slot 315, for example, where although supportable data rate 306 is low in time slot 315 for the user of FIG. 3A, supportable data rate 306 may be higher in time slot 315 for other users of the same communication channel. In addition, the technique shown in FIG. 3A of periodically sending maximum data requests avoids problems with priority data described above, by not shutting down the forward data channel for any extended period of time. Thus, FIG. 3A illustrates one technique for controlling data rate using an HDR modem in accordance with one embodiment.

Referring now to FIG. 3B, another example is illustrated of controlling data rate using an HDR modem in an exemplary CDMA wireless communication system in accordance with one embodiment. FIG. 3B shows graph 330 having data rate axis 331. Graph 330 shows data rate axis 331 plotted against time axis 332. Graph 330 shows an illustrative example of the instantaneous maximum data rate of a communication channel, such as forward data channel 116 shown in FIG. 1, which varies with time according to instantaneous maximum data rate curve 334. The instantaneous maximum data rate of a communication channel varies with the instantaneous signal quality of the communication channel as described above. The higher the instantaneous signal quality, the higher the maximum data rate that the instantaneous signal quality of the communication channel can support.

In the illustrative example shown in graph 330, time axis 332 is divided into 8 time slots, time slot 341 through time slot 348, numbered consecutively 1 through 8 in FIG. 3B. The standard HDR time slot is approximately 1.6 msec in duration. The maximum data rate for each time slot that the instantaneous signal quality of the communication channel can support, i.e. supportable data rate 336, is shown in FIG. 3B as horizontal steps corresponding to the data rate scale of data rate axis 331. Supportable data rate 336 is chosen from a finite set of available data rates according to the HDR technical specifications. For example, the data rates range in value from the maximum HDR data rate of approximately 2.4 Mbps to the minimum HDR data rate of approximately 38 Kbps. As seen in FIG. 3B, supportable data rate 336 must be less than the instantaneous maximum data rate curve 334. In other words, supportable data rate 336 must be below the instantaneous maximum data rate curve 334 because supportable data rate 336 cannot exceed the capacity of the communication channel. Thus, supportable data rate 336 in graph 330 varies from time slot to time slot as shown in FIG. 3B.

FIG. 3B shows one example of interspersing null data requests with maximum data requests to control the average data transfer rate in order to accommodate the processor, DMA, or buffer of the HDR modem. In the example of FIG. 3B, maximum data requests are sent on time slots 342, 344, 346, and 348, as indicated by the notation "Max. Request" above time slots 342, 344, 346, and 348, and null data requests are sent on time slots 341, 343, 345, and 347, as indicated by the notation "Null" above time slots 341, 343, 345, and 347. By not receiving data in time slots 341, 343, 345, and 347, and only receiving data in time slots 342, 344, 346, and 348, the average data rate is controlled.

For example, the average data rate can be controlled by sending maximum data requests on alternating time slots, such as every second time slot as shown in FIG. 3B, and null data requests on the remaining time slots. As with other examples, maximum data requests can be sent on every third time slot if a lower average data rate is required, or on every fourth time slot if an even lower average data rate is required, and so forth. Sending maximum data requests on every slot corresponds to normal operation and would provide the highest possible average data rate. As with the technique of FIG. 3A a moving average data rate can be computed to monitor the technique and help decide the frequency of sending maximum data requests. Thus, in the example shown in FIG. 3B, the example's specified value for the average data rate is met by sending maximum data requests on every second time slot.

The technique illustrated in FIG. 3B is also efficient in that the HDR modem maintains its own data rate below that which it can accommodate while leaving remaining time slots, which are a shared system resource, open for other users in the same system to use. In other words, the technique shown in FIG. 3B allows other users in the same system to use the remaining time slots, such as time slot 345, where although supportable data rate 336 is low in time slot 345 for the user of FIG. 3B, supportable data rate 336 may be higher in time slot 345 for other users of the same communication channel. Furthermore, the technique of FIG. 3B is simpler than that of FIG. 3A, so it may be easier to implement and consume less processing resources, such as CPU time, in the HDR modem. In addition, the technique shown in FIG. 3B of periodically sending maximum data requests avoids problems with priority data described above, by not shutting down the forward data channel for any extended period or time. Thus, FIG. 3B illustrates one technique for controlling data rates using an HDR modem in accordance with one embodiment.

Referring now to FIG. 3C, another example is illustrated of controlling data rates using an HDR modem in an exemplary CDMA wireless communication system in accordance with one embodiment. FIG. 3C shows graph 350 having data rate axis 351. Graph 350 shows data rate axis 351 plotted against time axis 352. Graph 350 shows an illustrative example of the instantaneous maximum data rate of a communication channel, such as forward data channel 116 shown in FIG. 1, which varies with time according to instantaneous maximum data rate curve 354. The instantaneous maximum data rate of a communication channel varies with the instantaneous signal quality of the communication channel as described above. The higher the instantaneous signal quality, the higher the maximum data rate that the instantaneous signal quality of the communication channel can support.

In the illustrative example shown in graph 350, time axis 352 is divided into 8 time slots, time slot 361 through time slot 368, numbered consecutively 1 through 8 in FIG. 3C. The standard HDR time slot, for example, is approximately 1.6 msec in duration. The maximum data rate for each time slot that the instantaneous signal quality of the communication channel can support, i.e. supportable data rate 356, is shown in FIG. 3B as horizontal steps corresponding to the data rate scale of data rate axis 351. Supportable data rate 356 is chosen from a finite set of available data rates according to the HDR technical specifications. For example, the data rates range in value from the maximum HDR data rate of approximately 2.4 Mbps to the minimum HDR data rate of approximately 38 Kbps. As seen in FIG. 3C, supportable data rate 356 must be less than the instantaneous maximum data rate curve 354. In other words, supportable data rate 356 must be below the instantaneous maximum data rate curve 354 because supportable data rate 356 cannot exceed the capacity of the communication channel. Thus, the supportable data rate 356 in graph 350 varies from time slot to time slot as shown in FIG. 3C.

FIG. 3C shows one example of interspersing null data requests with maximum data requests to control the average data transfer rate in order to accommodate the processor, DMA, or buffer of the HDR modem. In the example of FIG. 3C, maximum data requests are sent on time slots 367 and 368, as indicated by the notation "Max. Request" above time slots 367 and 368, and null data requests are sent on time slots 361, 362, 363, 364, 365, and 366, as indicated by the notation "Null" above time slots 361, 362, 363, 364, 365, and 366. By not receiving data in time slots 361, 362, 363, 364, 365, and 366, and only receiving data in time slots 367 and 368, the average data rate is controlled.

For example, the average data rate can be controlled when retransmit data has been requested by sending null data requests for the expected amount of time, including signal propagation delays from the mobile unit to the base station and back, and processing time at the base station, for the priority retransmit data to return to the mobile unit. Thus, the illustrative example of FIG. 3C shows null data requests being sent on 6 consecutive time slots, a time delay of approximately 10 msec assuming the standard HDR time slot duration of approximately 1.6 msec. In practice, the time delay could be approximately 50 to 100 msec but not long enough for the HDR modem to lose connection on the channel. Using this technique, the maximum data requests are sent when the priority data is ready to be transmitted so that the priority data and retransmit data are received first when the maximum data requests are sent. As described above, receiving retransmit data facilitates emptying blocks of data from the buffer. Thus, the technique illustrated by FIG. 3C controls the average data rate in a manner which addresses the "bottleneck" problem described above.

The technique illustrated in FIG. 3C is also efficient in that the HDR modem maintains its own data rate below that which it can accommodate while leaving remaining time slots, which are a shared system resource, open for other users in the same system to use. In other words, the technique shown in FIG. 3C allows other users in the same system to use the remaining time slots, such as time slot 365 where although supportable data rate 356 is low in time slot 365 for the user of FIG. 3C, supportable data rate 356 may be higher in time slot 365 for other users of the same communication channel. In addition, the technique shown in FIG. 3C of periodically sending maximum data requests avoids problems with priority data described above, by not shutting down the forward data channel for any extended period of time. Thus, FIG. 3C illustrates one technique for controlling data rates using an HDR modem in accordance with one embodiment.

Figure 4:
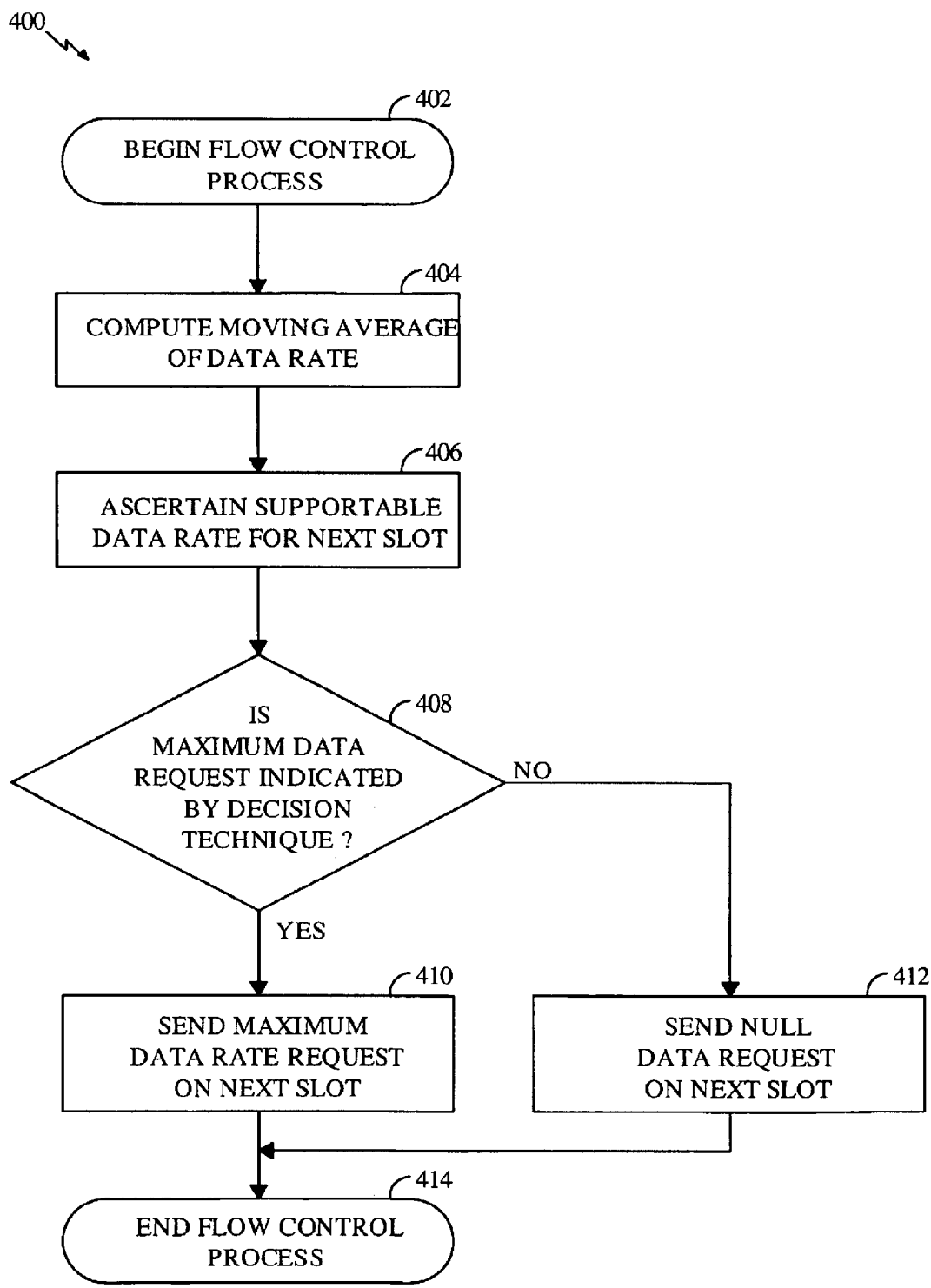
FIG. 4 is a flow chart illustrating the steps for controlling data rate in a wireless communication system in accordance with one embodiment of the present invention.

Referring now to FIG. 4, flow chart 400 describes one example of a process for controlling data rates using an HDR modem in a CDMA system in accordance with one embodiment. Flowchart 400 shown in FIG. 4 describes a process which can be performed in a mobile unit when data transmission is taking place on a forward data channel. The process shown in flowchart 400 can be performed by a mobile unit, such as HDR modem 102 shown in FIG. 1, for example, in a CDMA or spread spectrum communication system.

Continuing with FIG. 4, at step 402 the invention's process for controlling data rates, also referred to as "flow control process", begins. The process for controlling data rate may be initiated, for example, when the data buffer is over utilized, i.e. is filling up, or when retransmit data has been requested. Continuing with FIG. 4, at step 404 the process for controlling data rates computes a moving average of the data rates at which data has recently been transferred. For example, the average data rate can be computed over a fixed number of the most recent time slots. The moving average data rate can be used in deciding whether to send a maximum data request or a null data request on the next time slot, for example, as described above in connection with FIG. 3A, FIG. 3B, or FIG. 3C.

At step 406 of flowchart 400, the flow control process ascertains the supportable data rate for the next slot. As described above, the supportable data rate is the maximum data rate that the instantaneous signal quality of the communication channel can support, where signal quality can be measured as the signal to noise ratio of the communication channel. Once the supportable data rate is ascertained, which may include, measuring the instantaneous signal quality of the forward data channel, the flow control process continues at step 408.

At step 408 of flowchart 400, the flow control process uses the supportable data rate and the moving average data rate to determine whether a maximum data request or a null data request should be sent for the next time slot. For example, the flow control process can use any of the techniques described above in connection with FIG. 3A, FIG. 3B, or FIG. 3C, or combinations of those techniques. When the flow control process determines that a maximum data request should be sent for the next time slot, the flow control process proceeds to step 410. When the flow control process determines that a null data request should be sent for the next time slot, the flow control process proceeds to step 412.

At step 410 of flowchart 400, the flow control process sends a maximum data request over the DRC, i.e. over the data request channel, in conformance with the IS-856 technical standard for HDR modems. The flow control process then proceeds to step 414. At step 412 of flowchart 400, the flow control process sends a null data request over the DRC, i.e. over the data request channel, in conformance with the IS-856 technical standard for HDR modems. The flow control process then proceeds to step 414.

At step 414 of flowchart 400, the flow control process ends. The flow control process can be repeated immediately if ongoing flow control is needed, or the process can be terminated and the HDR modem can be operated normally until flow control is again required. Thus, FIG. 4 describes one example of a process for controlling data rates using an HDR modem in a COMA system, in accordance with one embodiment. It is noted that the above steps 402 through 414 described in relation to FIG. 4 can be implemented, in hardware or software, with the aid of a processor such as CPU 226 in HDR modem 202 in FIG. 2.

It is appreciated by the above description that the invention provides a method and apparatus for controlling data rates on a forward channel in a wireless communication system. According to one embodiment of the invention described above, flow control for data transmission to an HDR modem is achieved in a mobile unit in a wireless communication system. According to one embodiment, flow control is achieved using the data request channel in conformity with the HDR standard technical specifications for the mobile unit air interface. Therefore, the rate of data transmission can be controlled, which improves data communications using HDR by, for example, avoiding buffer overflows. Moreover, according to an embodiment of the invention described above, flow control is achieved without interfering with retransmission of priority data, such as retransmit data. Although the invention is described as applied to HDR data transmission in a CDMA system, it will be readily apparent to a person of ordinary skill in the art how to apply the invention in similar situations where flow control for data transmission is needed, for example, where a faster data link, such as Ethernet or Universal Serial Bus ("USB") is interfaced-with a slower data link such as RS232.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile unit. In the alternative, the processor and the storage medium may reside as discrete components in a mobile unit.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, different techniques for interspersing null data requests with maximum data requests could be used in addition to the techniques described in the present application. Therefore, the present invention is not intended to be limited to the embodiments shown herein but is to be accorded the widest scope consistent with the principles and novel features disclosed herein.

Thus, method and apparatus for controlling data rate on a forward channel in a wireless communication system have been described.

What is claimed is:

1. A method in a wireless communication system for communicating data from a base station to a mobile unit at a data transfer rate, said method comprising steps of:

computing a moving average of said data transfer rate;

ascertaining a supportable data rate for receiving data by said mobile unit;

transmitting to said base station a maximum data rate request so as to maintain said moving average of said data transfer rate substantially unchanged, said maximum data rate being equal to or lower than said supportable data rate.

2. The method of claim 1 wherein said wireless communication system for communicating data from said base station to said mobile unit comprises HDR data transmission.

3. The method of claim 1 wherein said wireless communication system comprises a CDMA wireless communication system.

4. The method of claim 1 wherein said computing step comprises computing said moving average of said data transfer rate over a pre-determined number of HDR time slots.

5. The method of claim 1 wherein said supportable data rate is selected from a finite set of HDR data transfer rates.

6. The method of claim 1 wherein said ascertaining step comprises measuring a signal quality of said forward data channel being communicate from said base station to said mobile unit.

7. The method of claim 1 further comprising transmitting to said base station a null data request so as to maintain said moving average of said data transfer rate substantially unchanged.

8. The method of claim 7 wherein said wireless communication system for communicating data from said base station to said mobile unit comprises HDR data transmission.

9. The method of claim 7 wherein said wireless communication system comprises a CDMA wireless communication system.

10. The method of claim 7 wherein said data transfer rate is selected from a finite set of HDR data transfer rates.

11. The method of claim 7 wherein said computing step comprises computing a moving average of said data transfer rate over a pre-determined number of HDR time slots.

12. The method of claim 7 wherein said supportable data rate is selected from a finite set of HDR data transfer rates.

13. The method of claim 7 wherein said ascertaining step comprises measuring a signal quality of said forward data channel being communicated from said base station to said mobile unit.

14. The method of claim 1 wherein said maximum data rate request is transmitted on an HDR data request channel.

15. The method of claim 7 wherein said null data request is transmitted on an HDR data request channel.

16. A mobile unit configured to communicate with a base station in a wireless communication system at a data transfer rate, said mobile unit comprising:
a CPU coupled to a buffer and an air interface module;
said CPU being configured to compute a moving average of said data transfer rate;
said CPU being further configured to ascertain a supportable data rate for receiving data by said buffer;
said air interface module being configured to transmit to said base station a maximum data rate request for receiving said data by said buffer so as to maintain said moving average of said data transfer rate substantially unchanged, said maximum data rate being equal to or lower than said supportable data rate.

17. The mobile unit of claim 16 wherein said wireless communication system utilizes HDR data transmission.

18. The mobile unit of claim 16 wherein said wireless communication system comprises a CDMA wireless communication system.

19. The mobile unit of claim 16 wherein said CPU is configured to compute said moving average of said data transfer rate over a pre-determined number of HDR time slots.

20. The mobile unit of claim 16 wherein said supportable data rate is selected from a finite set of HDR data transfer rates.

21. The mobile unit of claim 16 wherein said CPU is configured to ascertain said supportable data rate by measuring a signal quality of said forward data channel being communicated from said base station to said mobile unit.

22. The mobile unit of claim 16 wherein said air interface module is further configured to transmit to said base station a null data request so as to maintain said moving average of said data transfer rate substantially unchanged.

23. The mobile unit of claim 22 wherein said wireless communication system utilizes HDR data transmission.

24. The mobile unit of claim 22 wherein said wireless communication system comprises a CDMA wireless communication system.

25. The mobile unit of claim 22 wherein said data transfer rate is selected from a finite set of HDR data transfer rates.

26. The mobile unit of claim 22 wherein said CPU is configured to compute said moving average of said data transfer rate over a pre-determined number of HDR time slots.

27. The mobile unit of claim 22 wherein said supportable data rate is selected from a finite set of HDR data transfer rates.

28. The mobile unit of claim 22 wherein said CPU is configured to ascertain said supportable data rate by measuring a signal quality of said forward data channel being communicated from said base station to said mobile unit.

29. The mobile unit of claim 16 wherein said air interface module is configured to transmit said maximum data rate request on an HDR data request channel.

30. The mobile unit of claim 22 wherein said air interface module is configured to transmit said null data request on an HDR data request channel.

* * * * *

UNITED STATES PATENT AND TRADEMARK OFFICE
CERTIFICATE OF CORRECTION

PATENT NO.    : 6,731,947 B2
DATED         : May 4, 2004
INVENTOR(S)   : Hoagland et al.

It is certified that error appears in the above-identified patent and that said Letters Patent is hereby corrected as shown below:

Drawings,
Fig. 3B, please change "301" in the lower left corner to -- 331 --.

Column 6,
Line 30, please change "rate" to -- rates --.

Signed and Sealed this

Twenty-second Day of February, 2005

JON W. DUDAS
*Director of the United States Patent and Trademark Office*